United States Patent [19]

Marsh

[11] 4,015,471
[45] Apr. 5, 1977

[54] SPHERICAL ELECTROMAGNETIC WATER CURRENT VELOCITY SENSOR WITH PROTRUDING ELECTRODES

[75] Inventor: Lawrence B. Marsh, Silver Spring, Md.

[73] Assignee: Marsh-McBirney, Inc., Rockville, Md.

[22] Filed: Nov. 18, 1975

[21] Appl. No.: 633,000

[52] U.S. Cl. .......................... 73/194 EM; 73/170 A
[51] Int. Cl.² .......................................... G01F 1/58
[58] Field of Search .......... 73/170 A, 194 EM, 181

[56] References Cited

UNITED STATES PATENTS

| 3,161,047 | 12/1964 | Griswold | 73/194 EM X |
| 3,898,881 | 8/1975 | Darby, Jr. | 73/194 EM X |

Primary Examiner—Charles A. Ruehl
Attorney, Agent, or Firm—Lawrence E. Laubscher

[57] ABSTRACT

Electromagnetic sensing means are disclosed for measuring the velocity of a current of fluid, such as water, characterized by the use of a spherical body containing electromagnetic means including a first coil for establishing a first magnetic field in the fluid in which the spherical body is submerged, and a plurality of pairs of peripherally mounted circumferentially spaced pairs of diametrically arranged electrodes which are contained in a common first plane normal to the axis of the first magnetic field, each electrode of the electrode pair protruding radially outwardly from the outer surface of the spherical body a common distance which is between 0.100 and 0.125 inch per inch of the diameter of the spherical body. In a two-axis embodiment, first and second orthogonally-arranged pairs of diametrically opposed electrodes are provided, together with detecting and indicating means for comparing the electrical signals produced across the electrodes of the electrode pairs, respectively. In a three-axis embodiment, an orthogonally-arranged second coil is also provided for producing a second magnetic field the axis of which is contained in the common first plane and which bisects an opposite pair of angles defined by the diameters of the first and second pairs of electrodes, together with a third pair of diametrically opposed electrodes which are contained both in the first plane and in a second plane normal to the magnetic axis of the second coil. The signals produced across the three pairs of electrodes are compared to afford an indication of the fluid current velocity.

5 Claims, 7 Drawing Figures ic water velocity sensor with protruding electrodes

SPHERICAL ELECTROMAGNETIC WATER CURRENT VELOCITY SENSOR WITH PROTRUDING ELECTRODES

BRIEF DESCRIPTION OF THE PRIOR ART

Various types of fluid flowmeters of the electromagnetic Faraday type are well known in the patented prior art, as evidenced by the patents to Marsh U.S. Pat. No. 3,885,433 and Darby U.S. Pat. No. 3,898,881, both of which are assigned to the assignee of the instant invention.

Flowmeters of the cylindrical probe type are disclosed in the patents to Cushing U.S. Pat. No. 3,759,097, Zanker U.S. Pat. No. 3,668,931 and Watanabe U.S. Pat. No. 3,775,673, among others, and flowmeters using ellipsoidal or spherical probes are taught by the patents to Griswold U.S. Pat. No. 3,161,047, Bisberg U.S. Pat. No. 3,212,329 and Rosenberg U.S. Pat. No. 3,359,794. While generally the sensing electrodes are flush with the probe surface, it has also been proposed in the prior art to use electrodes that protrude at least to some extent from the probe surfaces, as indicated by the patents to Wood et al. U.S. Pat. No. 3,736,798 and the aforementioned Darby patent.

The present invention was developed to provide an improved electromagnetic flowmeter which avoids certain drawbacks inherent in the known devices. For example, in the cylindrical probe embodiments including electrodes which are flush with the probe surface, the devices possess the drawback that the two components of the water velocity vector are not faithfully reproduced as the vector rotates 360° in a plane normal to the magnetic axis of a first coil. Essentially, the water velocity vector as perceived by the cylindrical sensor varies in magnitude as the water velocity vector varies around the probe. This variation shows up as reductions in the sensed water vector predominantly at the 45° point, so that the vector is as much as 10 to 12% less than what is perceived by the electrodes when in the head-on position. As proposed by the Darby U.S. Pat. No. 3,898,881, if the electrodes are allowed to protrude from the surface of the cylindrically shaped probe by a determined amount relative to the probe diameter, then true cosine response can be achieved and the horizontal water velocity vector can be truly resolved into its X and Y components.

In flowmeters having a probe with an oblate spheroid shape, the water flowline around the sensor is more streamlined than it is around a cylinder. This particular shape allows a sensor of this type to be used at higher velocities than with a cylindrically shaped probe. Also, vortex shedding is not nearly as predominant in this shape, and therefore oscillation of the probe is not nearly the problem as in a cylindrically shaped probe. However, the oblate spheroid shape, with the electrodes at its periphery, still does not provide the proper cosine response for measuring the horizontal water velocity vector components. In the case of an oblate spheroid with face electrodes, an excellent cosine response is provided. Thus, when the water is flowing in a plane that is parallel to the electrodes, then the two pairs of electrodes accurately resolve the water velocity vector into the two vector components.

The optimum electromagnetic type sensor for oceanographic use would be a sensor that, if it were a two-axis unit, would properly measure the two components of the horizontal water vector not only when the water velocity is in the horizontal plane, but also when the device is subjected to large vertical oscillations of either the probe or the fluid in which it is measuring. That is, if the sensor were suspended from a surface-mounted buoy for measuring the horizontal water velocity vectors at say 2,000 feet, the instrument should not find itself being confused by the vertical oscillations due to wave influences on the surface buoy. It can be shown mathematically as well as by practical tests that if a sensor that is to measure the horizontal vectors of water velocity does not have cosine tilt response, then the instrument when subjected to vertical water oscillations will not properly measure the horizontal vectors either. More particularly, a portion of the vertical water velocity input will show up as a modification to and an error in the horizontal water velocity as indicated by the instrument. All three instruments previously described above (namely, the cylinder, the oblate spheroid with electrodes at the periphery, and the oblate spheroid with face electrodes) do not have proper tilt cosine response and thus are subject to large errors. When using any of the above instruments, extreme care must be taken by the user to prevent vertical motion of the sensor during measurement.

The present invention was developed to avoid the above and other drawbacks of the known electromagnetic flowmeter devices.

SUMMARY OF THE INVENTION

The present invention relates to an improved electromagnetic flowmeter which is particularly suitable for measuring water currents, both vertical and horizontal, in oceans, lakes, and other natural bodies of water, as well as in various man-made reservoirs and containers in which there is water motion.

Accordingly, a primary object of the present invention is to provide an improved electromagnetic fluid current velocity sensing apparatus including a spherical non-ferromagnetic probe body adapted to be submerged in the fluid current, electromagnetic means including a first coil mounted in the spherical probe body for establishing a first magnetic field in the fluid, and a plurality of circumferentially spaced pairs of diametrically arranged electrodes contained in a common first plane normal to the magnetic axis of the first coil, the electrodes of each electrode pair protruding from the surface of the spherical probe body a common distance which is between 0.100 and 0.125 inch per inch of the diameter of the spherical probe body.

According to a more specific object of the invention, two-axis response is achieved through the use of a single coil for producing a magnetic field the axis of which is normally vertical, first and second orthogonally arranged pairs of diametrically opposed electrodes being provided, which are contained in a plane normal to the magnetic axis of the first coil.

According to another object of the invention, a three-axis response is achieved by providing also a second coil for producing a second magnetic field the axis of which is contained in the first plane and which bisects the diameters of the first and second pairs of electrodes. A third pair of diametrically arranged electrodes are provided which are contained both in the first plane and in a second plane normal to the axis of the second magnetic field. The first and second coils are alternately energized and de-energized in opposite senses, respectively. Sampling means are provided for sampling the electrical signals produced by the first and second pairs of electrodes at given times relative to the energization and de-energization cycle of the first coil, and for sampling the electrical signals produced by the third pair of electrodes at corresponding times relative to the energization and de-energization cycle of the second coil.

DESCRIPTION OF THE FIGURES

Other objects and advantages of the invention will become apparent from a study of the following specification when viewed in the light of the accompanying drawing, in which.

DETAILED DESCRIPTION

Figure 1:
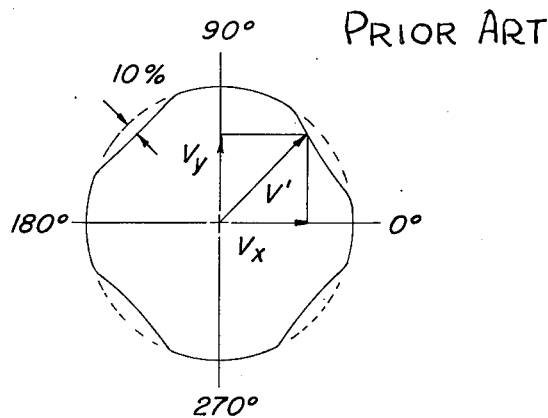
FIGS. 1 and 2 diagrammatically illustrate the responses over 360° of the cylindrical and spherical probes of the prior art, and the spherical probe with protruding electrodes of the present invention, respectively.
Figure 2:
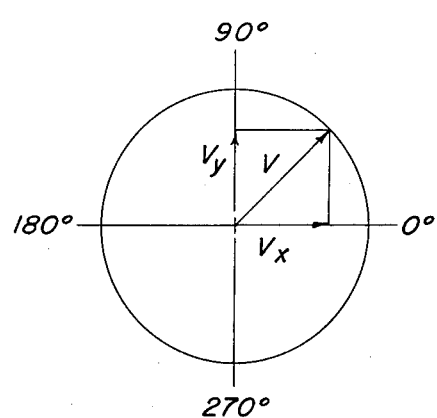

Referring first more particularly to FIG. 1, it will be seen that the 360° response curve of conventional cylindrical and spherical probes of the prior art provided with flush electrodes generally falls off by approximately 10% at the 45° points. FIG. 2 illustrates the desired uniform response that is achieved by the spherical probe of the present invention including peripheral electrodes that protrude from the probe surface a distance between 0.100 and 0.125 inch per inch of probe diameter.

Figure 3:
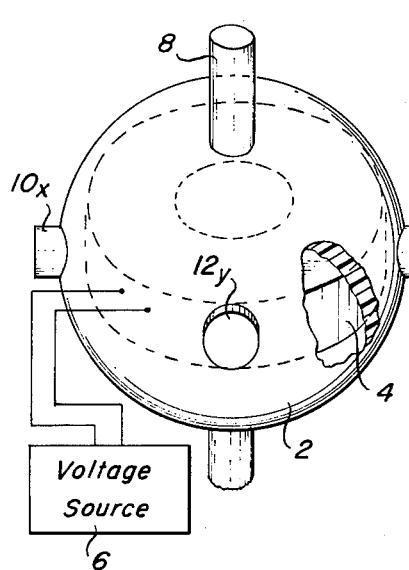
FIGS. 3 and 4 are diagrammatic perspective and plan views, respectively, of a first embodiment of the invention affording two-axis response.
Figure 4:
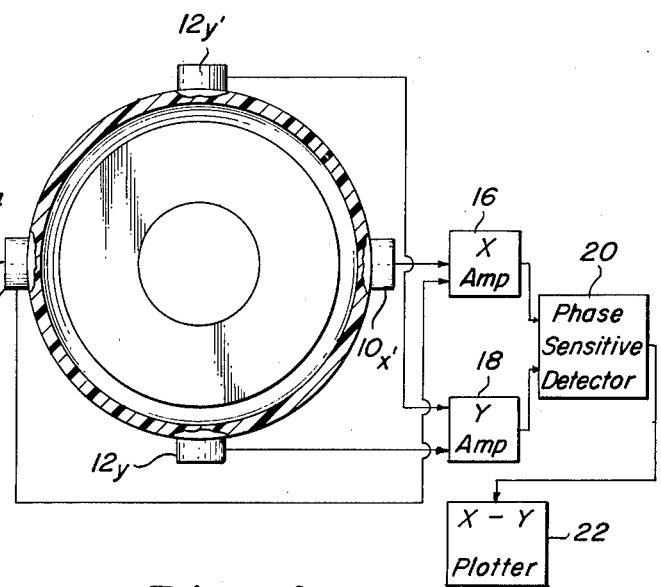

Referring now to FIGS. 3 and 4, the two-axis embodiment of the invention includes a spherical probe body 2 formed of a suitable non-ferromagnetic material (for example, a molded synthetic plastic material. Arranged within the probe body 2 is a coil 4 for establishing a magnetic field in the fluid within which the spherical probe body is submerged. The coil is energized by power supplied by a voltage source 6 (for example, an alternating-current voltage source). Vertical support means 8 suspend the probe within the fluid (for example, from a buoy). The coil is preferably oriented with its magnetic axis normal to the plane containing the fluid current the velocity of which is to be measured.

Mounted on the periphery of the spherical probe body 2 are two orthogonally arranged pairs of diametrically opposed electrodes 10x, 10x' and 12y, 12y', respectively. These electrodes are contained in a plane normal to the magnetic axis of the coil 4. In accordance with a characterizing feature of the invention, the electrodes of each electrode pair project radially outwardly from the outer surface of the spherical probe body by a common distance that is between 0.100 and 0.125 inch per inch of diameter of the probe body. The electrodes 10x and 10x' are illustrated as being colinear with the direction of fluid flow, as indicated by the arrow 14. As is conventional in the art, the electrodes 10x and 10x' are connected with the input terminals of X amplifier 16, and the electrodes 12y and 12y' are connected with the input terminals of the Y amplifier 18. The amplitudes of the electrical signals produced by the X and Y electrodes are compared by the phase sensitive detector 20 the output of which is connected with the X-Y plotter 22. Owing to the critically selected distance by which the electrodes protrude from the outer surface of the probe, the uniform response over 360° of FIG. 2 is achieved by the apparatus of FIGS. 3 and 4. The electric signal measuring and recording techniques are conventional in the art and need not be described in detail.

Figure 5:
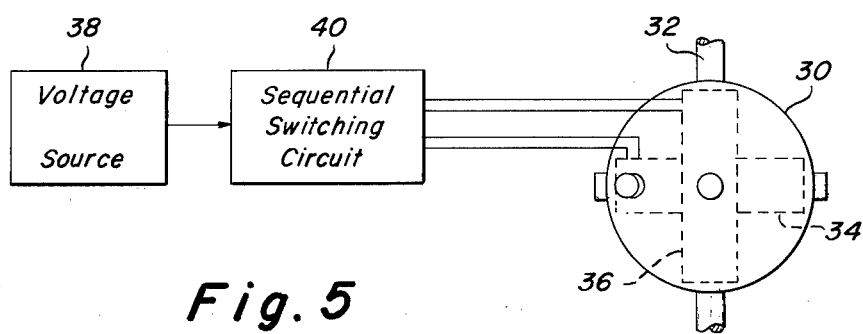
FIGS. 5 and 6 are diagrammatic side elevation and top plan views, respectively, of a three-axis embodiment of the invention.
Figure 6:
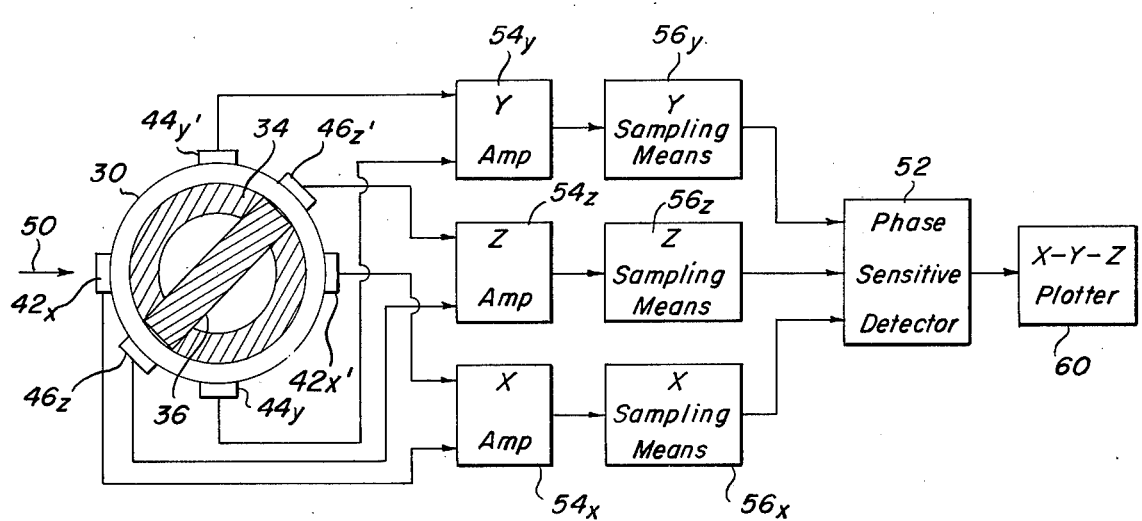

Referring now to FIGS. 5 and 6, in the three-axis embodiment of the invention, the spherical probe body 30, which is adapted for suspension in the fluid current by the support means 32, contains first and second coils 34 and 36, respectively, having orthogonally arranged magnetic axes that pass through the center of the spherical body, as shown in FIG. 5, the coils are alternately energized and de-energized sequentially by voltage source 38 and sequential switching circuit means 40. In this embodiment, three circumferentially spaced pairs of diametrically opposed electrodes 42x, 42x', 44y, 44y' and 46z, 46z' are mounted on the periphery of the spherical probe body in a common first plane normal to the magnetic axis of the first coil 34. The first and second electrode pairs 42x, 42x' and 44y, 44y' are orthogonally arranged, the second coil 36 being arranged so that its magnetic axis bisects the opposite angles defined by the diameters of the first and second electrode pairs. The third pair of electrodes 46z, 46z' are contained both in the first plane and in a second plane normal to the magnetic axis of the second coil 36. In accordance with the present invention, each electrode of each electrode pair protrudes a common distance from the probe surface that is between 0.100 and 0.125 inch per inch of probe diameter.

The electrical signals produced by the X electrodes 42x and 42x' are supplied to one input of phase sensitive detector 52 via X amplifier 54x and X sampling means 56x, and the electrical signals from the Y electrodes 44y and 44y' and the Z electrodes 46z and 46z' are similarly supplied to the corresponding inputs of the phase sensitive detector 52 via Y amplifier 54y and Y sampling means 56y and Z amplifier 54z and Z sampling means 56z, respectively.

Figure 7:
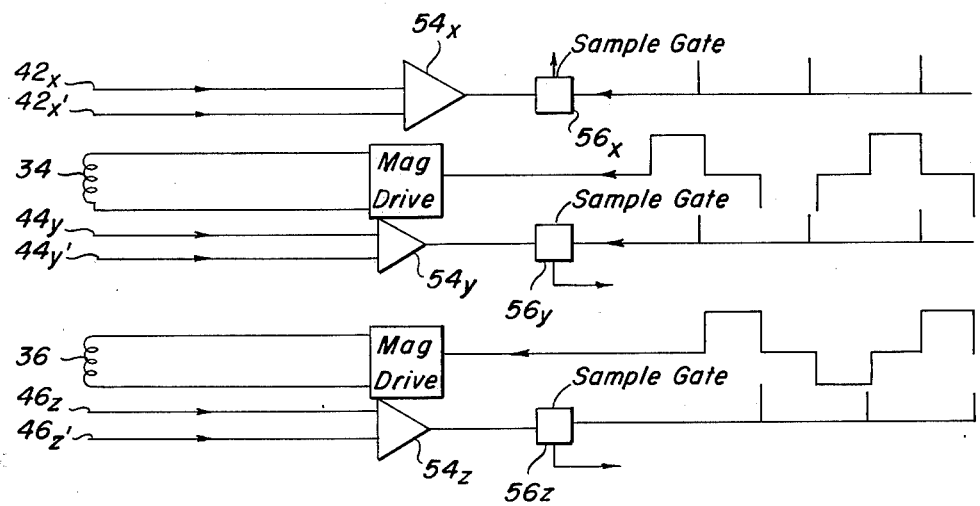
FIG. 7 is a schematic waveform diagram of the sampling operation of the apparatus of FIGS. 5 and 6.

Referring to FIG. 7, it will be seen that sample gates 56x and 56y are operated to pass simultaneously the X and Y signals to the phase sensitive detector at a given time relative to the energization operating cycle of the first coil 34, and sample gate 56z is operated to pass the Z signal to the phase sensitive detector at a corresponding given time relative to the energization operating cycle of the second coil 36. The remaining measuring and indicating of the vectorial resultant of the X, Y and Z signals is accomplished in a conventional manner (using, for example, an X-Y-Z plotter 60).

In both embodiments of the invention, owing to the fact that the electrodes protrude from the spherical body a given critical distance—namely, between 0.100 and 0.125 inch per inch of probe diameter—the horizontal water velocity vector is faithfully reproduced by the X and Y components of the sensor. In one embodiment that has been tested, a spherical probe molded from synthetic plastic material was provided having a diameter of four inches included a ¾ inch diameter rod which extended through body to simulate a stress member and support. In addition to the horizontal cosine response data, vertical tilt or cosine response data was also taken. This data indicated that there was some slight effect due to the rod passing through the center of the spherical body on the accuracy of the tilt data.

However, the effect was slight enough so that the results for exceeded those of the cylinder, the oblate spheroid with peripheral electrodes, or the oblate spheroid with face electrodes. By the placement of one other pair of electrodes which also protrude from the sphere, and another coil which is perpendicular to the circumference containing the electrode pair, the instrument senses three axes of flow in an ocean type environment. Owing to the sequential alternate operation of the pair of coils, simultaneous interaction between the X and Y and the Z vectors is avoided. As a consequence of the protrusion of the electrodes from the probe surface the critical distance of from between 0.100 and 0.125 inch per inch, the uniform response of FIG. 2 is achieved. If the electrode length were to be decreased below or increased above this value, then the shape of the curve would be distorted at the 45° points (as shown in FIG. 1, for example).

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. Electromagnetic sensing means for sensing the velocity of a fluid current, comprising
   a. a spherical body (2, 30) formed of a non-ferromagnetic material, said spherical body being adapted to be completely submerged in the fluid current;
   b. electromagnetic means including a first coil (4, 34) mounted within said spherical body for establishing in the fluid about said spherical body a first magnetic field the axis of which passes through the center of said spherical body;
   c. a plurality of pairs of diametrically-opposed electrodes (10, 12; 42, 44, 46) mounted in circumferentially spaced relation on the periphery of said spherical body,
      1. each of said electrodes being contained in a common first plane that is normal to the magnetic axis of said first coil,
      2. the electrodes of each electrode pair protruding from the outer surface of said spherical body by a common distance which is between 0.100 and 0.125 inch per inch of diameter of said spherical body; and
   d. detecting and indicating means (16, 18, 20, 22; 54, 56, 52, 60) for comparing the amplitudes of the electrical signals produced across the electrodes of the electrode pairs, respectively, thereby to afford an indication of the velocity of the fluid current.

2. Apparatus as defined in claim 1, wherein the magnetic axis of the first coil is normally generally vertical, and further wherein first (12, 42) and second (14, 44) pairs of said electrode pairs are orthogonally arranged in said first plane.

3. Electromagnetic sensing means for sensing the velocity of a fluid current, comprising
   a. a spherical body (30) formed of a non-ferromagnetic material, said spherical body being adapted to be completely submerged in the fluid current;
   b. electromagnetic means including a first coil (34) mounted within said spherical body for establishing in the fluid about said spherical body a first magnetic field the axis of which passes through the center of said spherical body, and an orthogonally arranged second coil (36) mounted within said spherical body for establishing in the fluid a second magnetic field the axis of which is contained in the plane of said first coil and also passes through the center of said spherical body;
   c. at least three pairs of diametrically-opposed electrodes (42, 44, 46) mounted in circumferentially spaced relation on the periphery of said spherical body,
      1. each of said electrodes being contained in the plane of said first coil, first and second pairs (42 and 44) of said electrodes being orthogonally arranged relative to said first coil, said second coil (36) and the third pair of electrodes (46) being contained in a plane that bisects one pair of opposite angles defined by the diameters of said first and second electrode pairs;
      2. the electrodes of each pair protruding from the outer surface of said spherical body by a common distance which is between 0.100 and 0.125 inch per inch of diameter of said spherical body; and
   d. detecting and indicating means (54, 56, 52, 60) for comparing the amplitudes and phases of the electrical signals produced across the electrodes of said electrode pairs, respectively, thereby to afford an indication of the velocity of the fluid current.

4. Apparatus as defined in claim 3, wherein said electromagnetic means includes sequential switching means (40) for alternately energizing and de-energizing said first and second coils in opposite senses, respectively.

5. Apparatus as defined in claim 4, wherein said detecting and indicating means includes first and sampling means (56x, 56y) for simultaneously sampling the electrical signals produced by said first and second pairs of electrodes at given times relative to the energization of said first coil, and second sampling means (56z) for sampling the electrical signals produced by said third pairs of electrodes at corresponding given times relative to the energization of said second coil.

* * * * *